United States Patent
Bessone et al.

(10) Patent No.: US 8,325,237 B2
(45) Date of Patent: Dec. 4, 2012

(54) MONITORING SYSTEM FOR MONITORING COVERAGE OF BROADCAST TRANSMISSIONS

(75) Inventors: Danilo Bessone, Turin (IT); Vincenzo Gigliotti, Turin (IT); Michele Lupano, Turin (IT); Alfredo Rinaudo, Turin (IT); Valter Squizzato, Turin (IT)

(73) Assignee: Telecom Italia S.p.A., Milan (IT)

( * ) Notice: Subject to any disclaimer, the term of this patent is extended or adjusted under 35 U.S.C. 154(b) by 1051 days.

(21) Appl. No.: 12/087,234

(22) PCT Filed: Dec. 30, 2005

(86) PCT No.: PCT/EP2005/014140
§ 371 (c)(1),
(2), (4) Date: Nov. 18, 2008

(87) PCT Pub. No.: WO2007/076882
PCT Pub. Date: Jul. 12, 2007

(65) Prior Publication Data
US 2009/0179989 A1    Jul. 16, 2009

(51) Int. Cl.
*H04N 17/00* (2006.01)
*H04N 17/02* (2006.01)
(52) U.S. Cl. .......... 348/180; 348/192; 348/729; 348/21; 455/226.2; 455/226.1
(58) Field of Classification Search .................. 348/192, 348/180, 189, 193, 181, 21, 729, 725, 723; 455/226.2, 226.1, 226.3
See application file for complete search history.

(56) References Cited

U.S. PATENT DOCUMENTS
7,471,244 B2 * 12/2008 Omura et al. ................. 342/463

FOREIGN PATENT DOCUMENTS
WO    WO 2004/086066 A1    10/2004

OTHER PUBLICATIONS
Bertolino, P. et al., "Detecting People in Videos for Their Immersion in a Virtual Space," XP-002379690, pp. 313-318, (2001).
Butler, D. et al., "Real-Time Adaptive Background Segmentation," Queensland University of Technology, 4 Sheets, (2003).

(Continued)

*Primary Examiner* — Jefferey Harold
*Assistant Examiner* — Jean W Desir
(74) *Attorney, Agent, or Firm* — Finnegan, Henderson, Farabow, Garrett & Dunner, L.L.P.

(57) ABSTRACT

A system for monitoring television signals broadcast by at least one transmission antenna in a broadcast area includes a monitoring control center and a plurality of remote monitoring units distributed in television signal receiving locations of the broadcast area remote from the transmission antenna. The remote monitoring units are configured to receive the television signals irradiated in the respective locations, process the television signals and send to the monitoring control center information related to the processed television signal. In particular, the remote monitoring units include a receiver adapted to receive the television signal, a measuring system adapted to perform measures on radio-electric features of the received television signal, and a communication system adapted to communicate measurement results to the remote monitoring center, exploiting a communication link between the remote monitoring unit and the control center.

20 Claims, 9 Drawing Sheets

OTHER PUBLICATIONS

Chien, S. Y. et a., "Efficient Moving Object Segmentation Algorithm Using Background Registration Technique," IEEE Tranactions on Circuits and Systems for Video Technology, vol. 12, No. 7, pp. 577-586, (Jul. 2002).

François, A. R. J. et al., "Adaptive Color Background Modeling for Real-Time Segmentation of Video Streams," Integrated Media Systems Center Institute for Robotics and Intelligent Systems—PHE 204, University of Southern California, pp. 1-6, (1999).

Jabri, S. et al., "Detection and Location of People in Video Images Using Adaptive Fusion of Color and Edge Information," Department of Computer Science George Mason University, and Center for Automation Research University of Maryland, pp. 627-630, (2000).

Lucchese, L. et al., "Color Image Segmentation: A State-of-the-Art Survey," Dept. of Electrical and Computer Eng., University of California, Santa Barbara, and Dept. of Electronics and Informatics, University of Padua, Italy, 15 Sheets, (2001).

Mureika, J. R., et al., "Multifractal Fingerprints in the Visual Arts," Technical Note, XP-002379691, Leonardo, vol. 37, No. 1, pp. 53-56, (2004).

Multi-layer Confidence Monitoring in Digital Television Broadcasting, Tektronix Enabling Innovation, downloaded from www.tektronix.com/video, Apr. 18, 2002, 8 pages.

Z Technology, Inc., DSS5800 Automatic Drive Test System with 8VSB Decoding, downloaded from www.ztechnology.com/pr_dss5800-2002.html on Mar. 8, 2012, 6 pages.

\* cited by examiner

MONITORING SYSTEM FOR MONITORING COVERAGE OF BROADCAST TRANSMISSIONS

CROSS REFERENCE TO RELATED APPLICATION

This application is a national phase application based on PCT/EP2005/014140, filed Dec. 30, 2005, the content of which is incorporated herein by reference.

BACKGROUND OF THE INVENTION

1. Technical Field of the Invention

The present invention relates to the field of broadcast transmissions, such as terrestrial analog or digital TeleVision (TV). In particular, the invention relates to the monitoring of signals in broadcast transmissions.

2. Description of Related Art

In broadcast transmissions like terrestrial analog or digital TV, television sets are adapted to receive TV signals broadcast by transmission centers or stations; for example, a TV signal of a certain broadcaster can be broadcasted through a certain geographic area by means of one or more transmitting antennas, and can be received by television sets, connected to proper receiving antennas, located in the area of broadcasting. The geographic area wherein a certain TV signal can be received is also referred to as being "covered" by the signal.

The features of a TV signal perceived at a particular location within the area of broadcasting depends on several factors.

For example, the strength of the TV signal in a certain location depends on the distance from the antenna irradiating the signal. In addition, the quality of the TV signal may be worsened by possible malfunctioning of the transmission centers, for example due to an uncorrected set up of operation parameters thereof. The quality of the TV signal is also conditioned by the atmospheric conditions in the area of broadcast, e.g., by the presence of rain, snow or fog. A further cause of TV signal degrade is the interference due to the presence of electromagnetic noise sources, like for example other transmission stations broadcasting different TV signals (either licensed or not).

Moreover, the TV signal of a same broadcaster is typically provided within the area of broadcasting by different transmission stations, in different locations and having in general a different irradiating power capability: thus, the signal perceived at a certain location of the area of broadcasting may differ (e.g., in strength) from the signal perceived at another location.

Before starting transmissions in a geographical area, a preventive planning is usually conducted for determining the best network configuration, for example in terms of best locations for placing the transmission stations, type of antennas to be used, and transmission power thereof.

Software tools are commonly used for simulating the TV signal propagation, so as to determine the coverage of an area of interest, as well as significant signal features, like the strength, at different locations in the area, based on a certain broadcast network configuration.

The deployment of the transmission stations within the area of broadcasting, particularly the locations and the transmission power of the antennas, is thus typically made following the indications of the planning phase.

In operation, the broadcaster may wish to monitor the actual signal coverage within the area of broadcasting (or a region thereof). This is typically done by one or more operators, equipped with portable measurement instruments capable of detecting the level of the TV signals, who move around the area to be monitored. Usually, for saving human time and costs, the measurements are conducted only in zones of the area of broadcasting that are reputed critical, e.g., in locations far away from a transmission station, or in dense urban areas.

An example of a commercially available portable measurement system is the DSS5800 Automatic Drive Test System, by Z Technology, Inc. (described in the web page http://www.ztechnology.com/pr_dss5800-2002.html). In particular, the DSS5800 is a portable terrestrial broadcast measurement system adapted to perform analysis on digital or analog TV signals during a drive test. It is a self contained system, incorporating a laptop Personal Computer (PC) running a dedicated drive test application software, and it is capable of measuring the strength of Radio Frequency (RF) fields and Digital TV (DTV) decoded parameters, with plotting and mapping capabilities, useful for generating signal coverage data including a full set of figure-of-merit parameters for DTV signals, and can plot these signal coverage data over a certain monitored area. The DSS5800 system is made up of a RF measuring hardware, an 8-level Vestigial Sideband modulation (8VSB) decoder, a Global Positioning System (GPS) receiver and a laptop PC. Data are collected by the operator during a socalled "drive test": the user drives to a predetermined location, makes a selected number of measurements of all the chosen frequencies, and then, having paused the system, moves to a next location of interest, for performing further measurements.

Tektronix, Inc. proposes (see document "Multi-layer Confidence Monitoring in Digital Television Broadcasting", downloadable from the web site of Tektronix at http://www.tek.com/Measurement/App_Notes/25_15952/eng/25W_15952_0.pdf) a multi-layer monitoring system for analyzing broadcasted DTV signals. Since the transmission in DTV systems occurs by means of sequences of signal processing and data processing steps organized into a layered model (more particularly, including compression, formatting, and distribution layers), different probe types are used within the monitoring system for measuring the transmission quality at different layers. For example, at the formatting layer, typical probes must be capable of monitoring characteristics of the digital video signal and, consequently, they include digital audio monitors, picture quality monitors and probes for detecting audio/video delay. For monitoring at the compression layer, the system includes probes capable of detecting malfunctioning in basic Moving Picture Experts Group (MPEG) processing. At the distribution layer, the monitoring system includes probes capable of monitoring the RF transmissions. The multi-layer monitoring system of Tektronix provides for the installation of monitoring probes at the network operator's points-of-presence, in such a way to be able to monitor RF and MPEG parameters of the transmission station. A solution is proposed for a distributed multi-layer confidence monitoring, wherein layer-specific probes are located at regional distribution centers, and connected, via Internet, to a video network operations center.

SUMMARY OF THE INVENTION

The Applicant has observed that the known approaches and systems for monitoring TV signals are not optimal, and presents several drawbacks.

The use of portable systems like the DSS5800 Automatic Drive Test System for verifying on the field the initially simulated signal coverage intrinsically limits the measurement to relatively few, critical zones of the area of broadcasting: indeed, the operators can not be asked to span the whole broadcasting area, or even a region thereof. Such an approach totally lacks of spatial capillarity, and does not allow to have a relatively complete knowledge of the actual TV signal coverage within the area of interest Moreover, the measurements are typically taken only once per each location, so the data are not time continuous, which prevents a timely estimation of possible TV signal degradations due to transmission stations' malfunctioning or to possible interferences caused by other TV signals, possibly from unlicensed broadcasters. A further disadvantage of that technique is that the results of the measurements cannot be immediately exploited: the measurements are in fact collected on the portable system and possible corrective actions for improved signal coverage can be taken only at the end of of the test campaign.

The monitoring system proposed by Tektronix is sophisticated, but for this reason it is also costly. The measurement probes are only placed at the network operator's points-of-presence, i.e. at the transmission stations, so also in this case the measurements lacks of spatial capillarity.

The provision of the monitoring probes in correspondence of the transmission stations allows monitoring the transmission quality at the transmitter side, whereas no information is available about the quality of the signal where it is at least potentially received, i.e. in points of the broadcasting area where a user might install an antenna for receiving and enjoying the TV broadcast transmissions.

Moreover, the distributed monitoring solution described by Tektronix relies on the availability of the Internet both at the regional distribution centers and at the video network operating center, which is per-se a possible limitation.

As a further drawback, both the monitoring system proposed by Tektronix and the DSS5800 Automatic Drive Test System need the presence of a human operator: in the first case, an operator, at a video network point-of-presence, personally controls the measurement results provided by the measurement probes, while in the latter case, the drive test is by its intrinsic nature performed by a person.

In view of the foregoing, the Applicant has tackled the problem of providing a relatively simple, low-cost monitoring system for broadcast signals adapted to overcome the drawback of the known systems, particularly capable of performing, without excessive burden for the broadcaster, a time-continuous monitoring of the broadcasted signal even where it is at least potentially received, i.e. in points of the broadcasting area where a user might install an antenna for receiving and enjoying the TV broadcast transmissions, with high spatial capillarity, and not necessarily attended by human operators.

The Applicant has found that the TV signal can be efficiently monitored by providing a capillary monitoring system comprising at least a plurality of probes disseminated in a broadcast area and suitable to measure the TV signal irradiated in the corresponding locations by at least a transmission antenna, and a control centre configured to receive from the probes information about the measurements and to use it. The information can be used for example for adjusting the broadcasted signal so as to have locally the best reception, or for detecting and solving problems in the transmission system. The probes may communicate with the control center in different ways, by wired or wireless connection, for example by sending messages on a wireless telephone system. The probes are suitable to receive both analog and digital TV signals and are associated with respective processing apparatuses that can perform several types of measurement, both on the audio and on the video parts of the signals.

The technique of the present invention offers at least the following advantages:
capillarity,
low cost;
continuous monitoring;
versatility;
possibility of immediate communication of measurements results.

According to a first aspect thereof, the present invention thus relates to a monitoring system for monitoring TV signals broadcasted by at least one transmission antenna in a broadcast area, the monitoring system including:
at least one monitoring control center;
at least one remote monitoring unit positioned in a TV signal receiving location of the broadcast area remote from the transmission antenna, the remote monitoring unit being configured to receive the TV signal irradiated in the location, process the TV signal and send to the monitoring control center information related to the processed TV signal.

The remote monitoring unit preferably comprises:
a receiver adapted to receive the TV signal;
a measuring system adapted to perform measures on radio-electric features of the received TV signal;
a communication system adapted to communicate measurement results to the remote monitoring center, exploiting a communication link between the remote monitoring unit and the control center.

The at least one remote monitoring unit preferably includes a plurality of remote monitoring units distributed on the broadcasting area.

The measuring system of the remote monitoring unit may include at least one among a signal peak detector, adapted to detect a peak of the received TV signal, and a signal RMS value detector, adapted to detect an RMS value of the received TV signal.

The remote monitoring unit may further comprise a control system, which is adapted to establish whether the received TV signal complies with predetermined constraints.

The control system may be further adapted to cause the communication system to send to the monitoring control center a notification in case the received TV signal does not comply with predetermined constraints.

The remote monitoring unit may further comprise a signal processing system adapted to extract from the received TV signal information contents carried by the signal.

The information contents may include at least one among a video content, an audio content, teletext data and test data.

Preferably, the remote monitoring unit further includes a local storage system adapted to store the extracted information contents.

The control system may be further adapted to cause the communications system to send to the monitoring control center the stored extracted information contents.

The remote monitoring unit may be adapted to automatically conduct measurements of the received TV signal according to a predetermined measurement schedule.

The remote monitoring unit may be adapted to conduct measurements on the received TV signal responsive to a request from the monitoring control center.

The remote monitoring unit is preferably adapted to receive from the monitoring control center configuration parameters for configuring an operation of the remote monitoring unit.

The communication link may include a mobile telephony network link.

The monitoring control center and the remote monitoring unit may be configured to communicate via SMS.

The monitoring control center may be configured to control the broadcasted TV signal responsive to the information received from the remote monitoring unit.

The present invention also relates to a method for monitoring TV signals broadcasted by at least one TV signal broadcasting antenna in a broadcast area, the method including:
providing at least one monitoring control center;
providing at least one remote monitoring unit positioned in a TV signal receiving location of the broadcast area and configured to receive the TV signal, process the TV signal and send to the monitoring control center information based on the processed TV signal.

The method may further comprise:
providing a communication link between the remote monitoring unit and the control center; and
causing the remote monitoring unit to communicate measurement results to the remote monitoring center, exploiting the communication link.

BRIEF DESCRIPTION OF THE DRAWINGS

The features and advantages of the present invention will be made apparent by the following detailed description of an embodiment thereof, provided merely by way of non-limitative example, description that will be conducted making reference to the attached drawings, wherein.

DETAILED DESCRIPTION OF THE PREFERRED EMBODIMENT(S)

Figure 1:
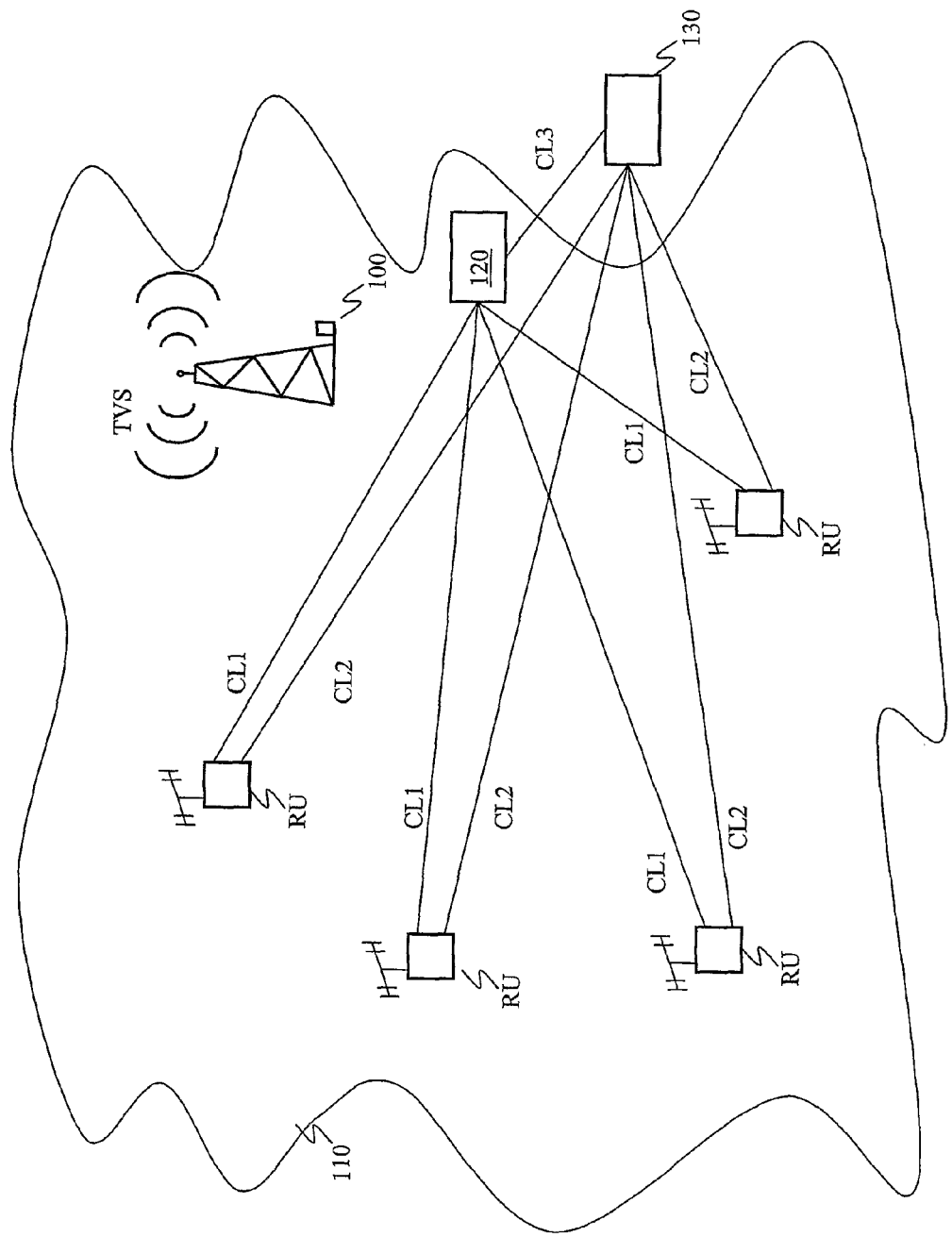
FIG. 1 is a portion of a broadcast transmission system comprising a monitoring system according to an embodiment of the present invention.

Making reference to the drawings, in FIG. 1 a portion of a broadcast transmission system, particularly but not imitatively a broadcast system of a TV network, is pictorially shown, wherein a monitoring system according to an embodiment of the present invention is advantageously exploited.

A TV signal transmitting antenna 100 represents a generic transmission station of the TV network, and broadcasts a TV signal TVS within a corresponding area of broadcasting 110, being a geographic area of interest covered, i.e., reached, by the TV signal TVS irradiated by the transmitting antenna 100.

The TV signal TVS may be either an analog TV broadcasting signal, or a Digital TV (DTV) broadcasting signal. For example, the TV signal TVS may comply with any one of the known TV broadcasting standards, like for example the PAL, SECAM, NTSC DVB-T. In the case the TV signal TVS is analog, it comprises an Amplitude-Modulated (AM) signal for the video content (pictures), and a Frequency-Modulated (FM) signal for the audio content. In the case of DTV broadcasting, the TV signal TVS is a digital signal conveying packets (or "bursts") of bits representing both video and audio contents. More particularly, the packets of bits are properly compressed, for example, using one of the MPEG compression standards, like the MPEG2 or MPEG4, and multiplexed together in such a way to form a so-called MPEG transport stream.

As mentioned in the background section of the present document, the coverage of each location within the area 110 by the TV signal TVS varies. For example, the strength of the TV signal TVS at a certain location far away from the transmitting antenna 100, or positioned behind an obstacle like a hill, a mountain, or simply a building, is typically weaker with respect to a location close to the antenna 100, or in line of sight therewith. Different signals, irradiated for example by transmission stations of different broadcasters, may interfere with the TV signal TVS in some locations of the area 110, thereby causing variations in the perceived strength of the TV signal TVS. Furthermore, the quality of the TV signal TVS is affected by particular atmospheric conditions, like rain, snow and fog.

In order to monitor the coverage of the area 110 by the broadcasted TV signal TVS, according to an embodiment of the present invention a monitoring system is deployed in the area. In particular, the monitoring system includes a plurality of remote monitoring units RU, capable of monitoring the actual coverage of the TV signal TVS, which are spread across the area 110. Each remote unit RU monitors the coverage by the TV signal TVS where the remote monitoring unit is located, by measuring the salient features of the signal TVS. The spatial capillarity of the proposed monitoring system depends on the number of remote monitoring units RU which are deployed in the area 100. According to necessity, certain zones of the area 100 may require a higher spatial capillarity with respect to other. For example, if a zone of the area 100 is particularly critical, as in the case of an urban zone, a higher capillarity, and thus a relatively high number of remote units may be desirable. Conversely, in a scarcely populated zone, a lesser capillarity may be regarded as sufficient, thus a smaller number of remote monitoring units may be sufficient.

Each remote monitoring unit RU is connected, by means of a respective first, particularly a bidirectional communication link CL1, to a control center 120, which may be placed within the area or outside it. The control center 120 controls all the remote monitoring units RU, instructing them about which type of measurements have to be executed and how the measurements are to be performed. Moreover, via the first communication link CL1, each remote monitoring unit RU is capable of transmitting to the control center 120 the results of requested measures, and to issue alarms if some of the monitored parameters fall outside predetermined ratings, as will be described in greater detail later.

Additionally, each remote monitoring unit RU is further connected by means of a respective second communication link CL2 to a central file storage system 130, for example an FTP server, which receives and stores periodic, e.g., daily, measurement reports generated by the remote monitoring units RU.

Each one of the two communication links CL1, CL2 may be or include a wired or, preferably, a wireless link. More particularly, in the wired link case, each remote monitoring unit RU may be connected to the control center 120, and/or to the FTP server 130 by means of data connections, for example complying with the RS-232 standard, or by exploiting a Public Switched Telephone Network (PSTN) (in which case the remote monitoring units include or use a modem), while, in the wireless case, a wireless communication network like a Public Land Mobile Network (PLMN) (a GSM or UMTS network) or a WiFi network may be used.

The control center 120 may be connected with the FTP server 130 by a link CL3 (that can be either wired or wireless). Alternatively, the control center and the FTP server 130 may coincide and form a single control center, adapted to instructing the remote units RU and to store the reports provided therefrom. In particular, the provision of the FTP server 130 is not strictly necessary: the remote monitoring units RU might in fact send the periodic reports directly to the control center 120.

Figure 2:
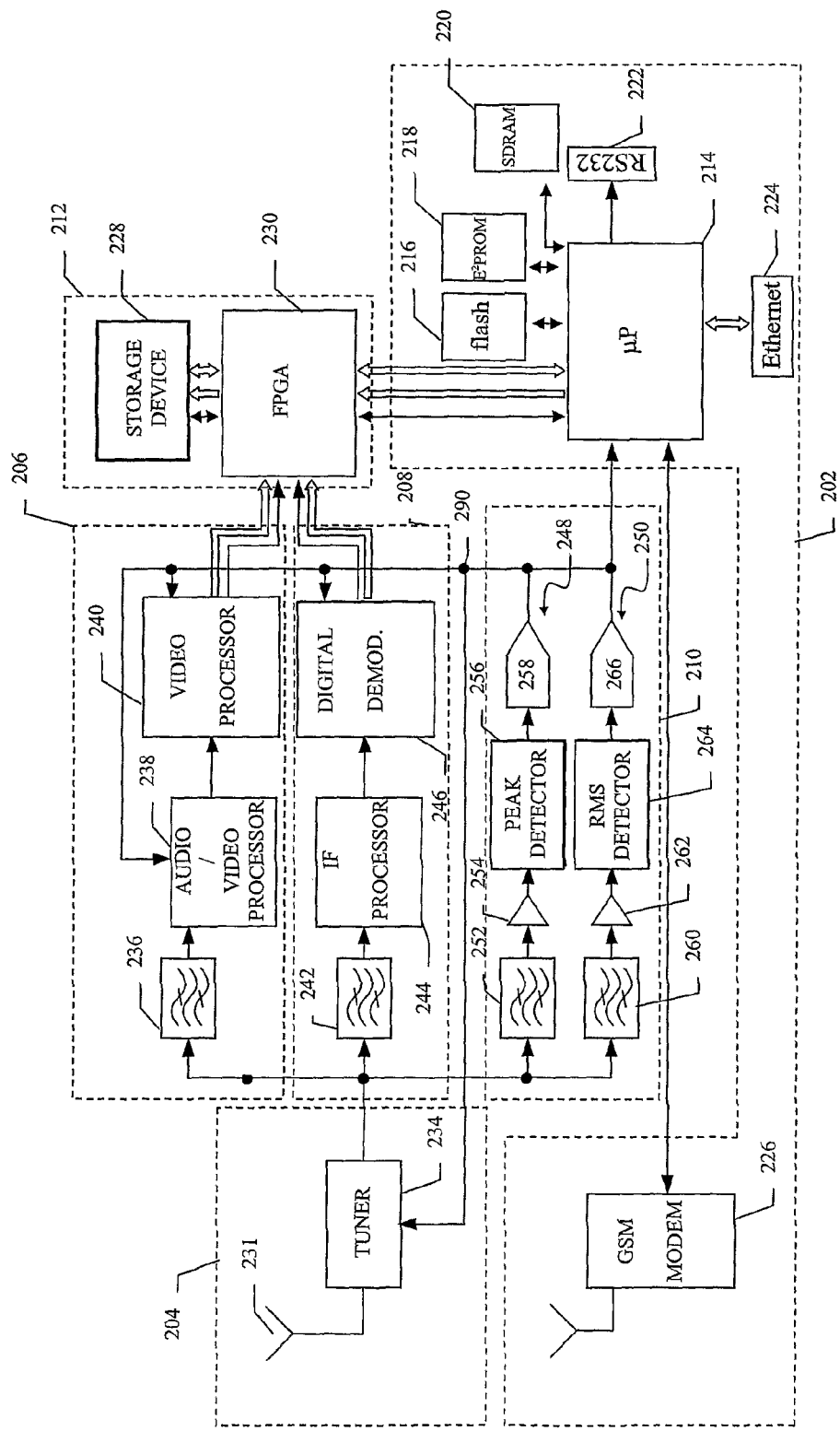
FIG. 2 depicts the structure of a generic remote monitoring unit of the monitoring system, in terms of its main functional blocks, according to an embodiment of the present invention.

Referring to FIG. 2, the structure of a generic remote monitoring unit RU is illustrated in terms of its main functional blocks.

More particularly, the remote monitoring unit RU comprises a control block 202, adapted to manage all the operations carried out by the remote unit RU; a tunable signal receiver block 204, adapted to receive the TV signal TVS; an analog signal processing block 206 for the processing of analog TV broadcasting signals; a digital signal processing block 208 for the processing of DTV broadcasting signals; a data storage block 212 adapted to temporarily store data, resulting from the TV signal acquisition, to be provided to the control block 202; and a measure block 210, adapted to conduct measures, particularly but not limitatively peak and Root Mean Square (RMS) measures, on the received TV signal TVS.

The control block 202 includes in particular a microprocessor 214 that controls the operations executed by the other blocks of the remote unit RU; the microprocessor 214 is provided with storage peripherals, and with communication interface peripherals for communicating with the control center 120 and the FTP server 130, and communicates with the other blocks of the remote unit RU via a communication channel. More particularly, permanent data and instructions used by the microprocessor 214 for its operation are stored in a non-volatile memory, for example a flash memory 216 and/or an $E^2PROM$ 218, which can also be used as a back-up memory for storing relevant data in case of power failure. A volatile semiconductor memory 220, for example an SDRAM is used as a microprocessor working memory for temporarily storing data during the operation of the microprocessor.

The communication channel over which the microprocessor 214 communicates with the remaining blocks of the remote unit RU, particularly the tunable receiver 204, the analog and digital signal processing blocks 206 and 208 and the measure block 210 includes an Inter Integrated Circuits ($I^2C$) bus 290.

In a preferred embodiment of the present invention, the interface peripherals for communicating with the control center 120 and the FTP server 130 (over the wired and/or wireless communication links CL1, CL2) include an RS232 interface 222 and an Ethernet interface 224 (for wired communication links CL1, CL2), and a GSM modem 226 or a UMTS modem, or WiFi interface (for wireless communication links CL1, CL2).

For example, the RS232 and Ethernet interfaces may be used for transmitting data to the control center 120, and/or to the FTP server 130, in case the distance of the remote unit RU from the control center 120 is not too high; in particular, the Ethernet interface may be suitable for longer-distance communication links compared to the RS232 interface. Both the RS232 interface and the Ethernet interface are also suitable for locally connecting to the remote unit a portable terminal, for example for the on-field configuration or maintenance purposes, in case of temporary unavailability of the communication links CL1, CL2.

The GSM modem 226 may be used for transmitting the results of TV signal measures to the control center 120, and/or to the FTP server 130, or for receiving instructions or configuration data therefrom, by means of plain voice calls, SMSs, circuit-switched and packet-switched (GPRS) calls.

The storage block 212 includes a random access storage device of relatively high capacity, preferably an SDRAM 228 capable of temporarily storing the data provided by the analog and digital signal processing blocks 206 and 208 (said data comprise information characterizing the received TV signal TVS, as will be explained in the following) and making them available to the microprocessor 214 upon request. For this purpose, inputs and outputs of the storage device 228 are selectively coupled to the analog and digital signal processing blocks 206 and 208 and with the microprocessor 214 by means of a routing logic circuitry 230, for example realized by means of a Field Programmable Gate Array (FPGA).

The tunable receiver block 204 includes a receiving antenna 231 adapted to receive the TV signal TVS broadcasted by the transmitting antenna 100. The receiving antenna 231 is connected to a tuner circuit 234, controlled by the microprocessor 214 by means of the $I^2C$ bus 290. For example, considering the PAL standard, the receiving antenna 231 is capable of receiving RF signals belonging to the Very-High Frequency (VHF) band (ranging from 30 MHz to 300 MHz) and to the Ultra-High Frequency (UHF) band (ranging from 300 MHz to 3 GHz; the licensed TV spectrum is up-limited to approximately 855 MHz). It is pointed out that different TV broadcasting standards (for example, those adopted in the U.S.A. and in Japan) may have different characteristic frequencies and frequency bands, but the system of the present invention is not for this reason to be considered of limited applicability to any specific TV broadcasting standard In particular, referring again to the exemplary and non limitative case of the PAL system, both analog TV broadcasting signals and DTV broadcasting signals may be broadcasted in the area 110, by means of modulated carrier signals of specific frequencies belonging to the VHF and UHF bands. The available bandwidth is subdivided into an ordinate sequence of "channels"; a channel is assigned to a frequency interval, i.e. it has a bandwidth of 8 MHz. In the case of analog TV signal, two different carrier signals per transmission channel are provided: a video carrier signal (for the pictures), having a frequency 1.5 MHz above the channel lower frequency, and an audio carrier signal, having a frequency 5.5 MHz above the channel lower frequency.

The microprocessor 214 is capable of tuning the tuner circuit 234 so as to select any desired channel. The tuner circuit 234 shifts the frequency of the carrier signal(s) related to the selected channel(s) to an Intermediate Frequency (IF) (for example, equal to 38.9 MHz, as in typical TV set tuners compatible to European standards), providing a corresponding IF version IFTVS of the TV signal TVS. The IF signal IFTVS is fed to the analog signal processing block 206, to the digital signal processing block 208, and to the measure block 210 (in particular, the microprocessor 214 may select whether the signal is to be fed to the analog or to the digital signal processing blocks, depending on the type of analysis to be performed).

The analog signal processing block 206 includes a filter circuit 236, an audio/video demodulator 238 and a video processor 240. In particular, and merely by way of example, for the audio/video demodulator the commercially available electronic component known as TDA9855 may be used, and the video processor may be implemented by the commercially available electronic component SAF7113, both by PHILIPS. The IF signal IFTVS is firstly filtered by the IF filter circuit 236, then it is fed to the audio/video demodulator 238. The audio/video demodulator 238 demodulates the IF signal IFTVS and provides a base-band composite video signal CVS, representing the video component of the TV signal TVS and a base-band audio signal AS, representing the audio component of the TV signal TVS.

The audio signal AS is fed to the GSM modem 226, for being wireless-transferred to the control center 120 (or to any other telephone number, configurable by the control center) in such a way to allow an operator to determine the quality of the transmitted and received audio signal.

The composite video signal CVS is fed to the video processor 240, which, according to the instructions provided by the microprocessor 214 via the I²C bus 290, processes the composite video signal of the selected transmission channel and outputs the relevant information.

In particular, standard analog color TV broadcasting occurs by means of a sequential transmission of pictures, each one obtained by repeatedly scanning (the so-called "raster scan") a scene. The resulting composite video signal CVS is in particular the combination of a luminance signal Y and two chrominance signals Cb, Cr. The luminance signal Y varies temporally according to the spatial variation of the brightness of the picture. The chrominance signals Cb, Cr carry the color information of the picture (it is pointed out that the present invention is not limited to the specific way the brightness and color information are encoded).

Figure 3A:
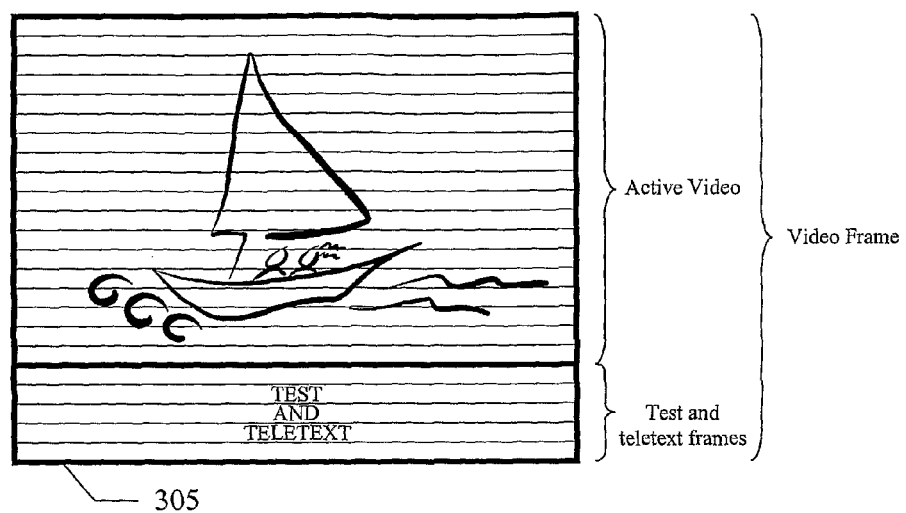
FIG. 3A illustrates how a generic video frame can be structured in terms of frame lines according to an embodiment of the present invention.

A generic picture comprises a plurality of lines that altogether form a so-called video frame. For example, referring to FIG. 3A, the PAL standard prescribes that a video frame 305 made up of 625 lines, not all of which are however used to carry picture information.

The composite video signal CVS is in fact advantageously exploited also for conveying additional information. In particular, the generic video frame includes an "active video frame", corresponding to the actual picture and made up of 575 lines, while the remaining 50 lines are used for test purposes (test lines) and for implementing a teletext service (teletext lines).

The video processor 240 is adapted to sample the composite video signal CVS, and to convert the samples into digital form, so as to obtain a digital representation of the lines making up the video frames. The video processor 240 makes available at its output, in sequence, the sampled lines of the video frames received by the TV signal.

Each one of the 625 lines of the video frame is thus sampled by the video processor 240. According to the video format adopted by the International Radio Consultative Committee (CCIRR) 601 recommendation, a generic line of a video frame is made up of 720 discrete picture elements (pixels), obtained by sampling the lines of the video frame. Using the 8-bit coding format ITU 656 YUV 4:2:2, every pixel has an associated 8-bit sample for the luminance signal Y, whereas only one 8-bit sample for the Cb signal and one 8-bit sample for the Cr signal are taken for every two adjacent pixels. In this way, the video processor 240 generates, for each video frame line, a 1440-byte word. It is pointed out that the present invention is not limited to the specific video format and coding adopted, and the number of bytes for encoding a video frame line may greatly vary.

The output of the video processor 240, transported by means of an 8-bit data bus, is routed to the storage device 228 by the logic circuitry 230. Consequently, the video processor 240 provides the 1440 bytes corresponding to a video frame line to the storage device 228 in chunks of 8 bits. This process is repeated until all the lines of a video frame are stored in the storage device 228, and then the process is restarted for the next video frame.

The microprocessor 214, properly instructed by the control center 120 by means of a specific request coming therefrom, for example via an SMS, is adapted to get the digitalized video frame lines stored in the storage device 228, and to transmit them to the control center 120 via for example the GSM modem 226, the RS232 interface 222 or the Ethernet interface 224. In this way, an operator at the control center 120 is put in condition of determining the quality and the information content of the TV signal received by the remote unit RU, thus evaluating the coverage of the TV signal TVS in the proximity of the remote unit RU.

In particular, the control center 120 may request the transmission of one or more video frame lines stored in the storage device 228, an entire video frame, or two or more video frames. The microprocessor 214 may properly instruct the video processor 240, causing it to start the processing (sampling and quantization) of the composite video signal CVS, the logic circuitry 230, to route the output data coming from the video processor 240 to the storage device 228.

Figure 3B:
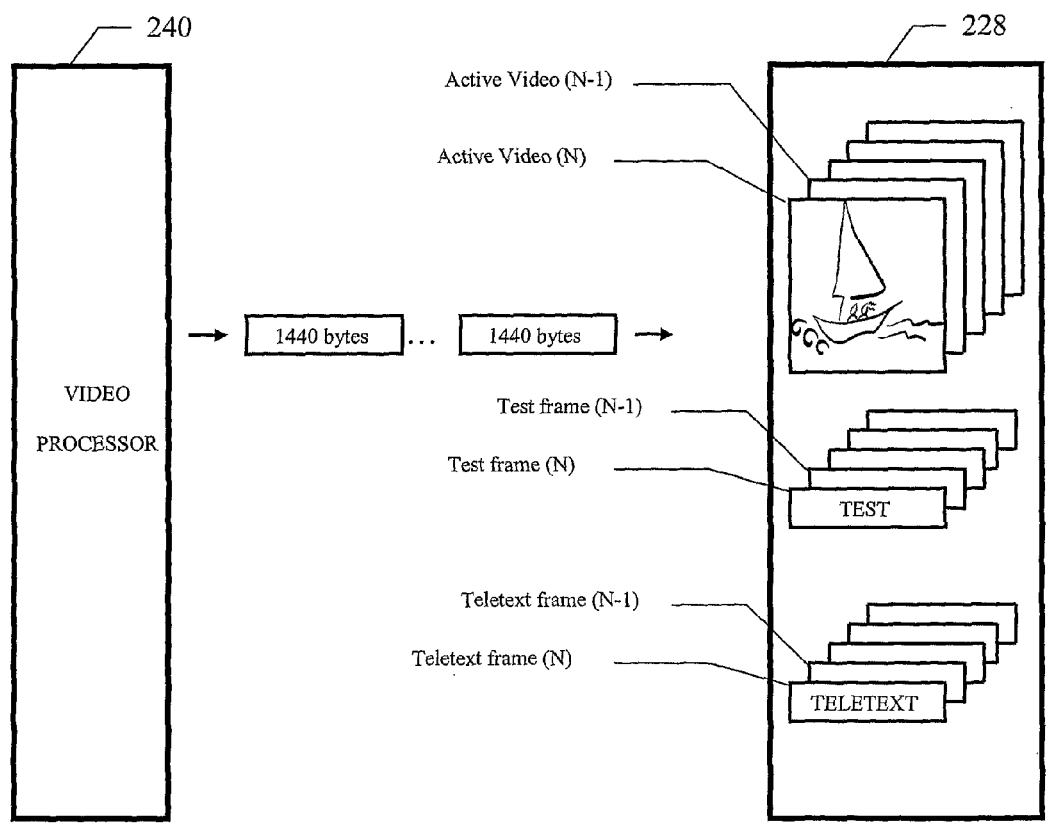
FIG. 3B shows a possible solution for storing video frames into a storage device according to an embodiment of the present invention.

In the storage device 228, the active frames are stored separately from the test lines and the teletext lines, as is shown in FIG. 3B. In this way, the control center 120 may selectively request the transmission of only the teletext lines or of the test lines, useful for example to perform dedicated analysis, without having to receive an entire video frame (the transmission of which may take a relatively long time).

In case the TV signal TVS is a DTV broadcasting signal, the signal IFTVS is fed to the digital signal processing block 208. The digital signal processing block 208 includes a filter circuit 242, an IF processor 244 and a digital demodulator 246. In particular, and merely by way of example, for the IF processor the commercially available electronic component known as TDA9889 may be used, and the digital demodulator may be implemented by the commercially available electronic component TDA10046, both by PHILIPS.

As in the case of analog TV signals, the signal IFTVS is firstly filtered by the IF filter circuit 242, then the filtered signal is fed to the IF processor 244. The IF processor 244 down-converts the signal IFTVS to a further intermediate frequency signal I2FTVS, of lower frequency I2F (for example, equal to 5 MHz, as in typical DTV receivers); the down-converted and filtered signal I2FTVS is fed to the digital demodulator 246. The digital demodulator 246, properly initialized by the microprocessor 214, demodulates the signal I2FTVS, outputs a corresponding MPEG transport stream, carrying, multiplexed and compressed, the transmitted pictures and audio signals, and provides the MPEG transport stream to the storage device 228. For this purpose, the digital demodulator 246 is connected to the logic circuitry 230 by means of an 8-bit data bus. The MPEG transport stream may thus be fed to the storage device 228 in chunks of, e.g., 8 bytes at a time.

The microprocessor 214 is programmed to carry out an analysis on the MPEG transport stream stored in the storage device 228 depending on requests received (e.g., via SMS) from the control center 120. For example, the microprocessor 214 can measure the Bit Error Rate (BER) and the Signal-to-Noise Ratio (SNR) of the MPEG transport stream, and notify the measure results to the control center 120, via the GSM modem 226 (e.g., using SMS), and/or via the RS232 interface 222 and/or via the Ethernet interface 224.

Similarly to the analog TV signal case, the microprocessor 214 may directly transmit part of the stored MPEG transport stream to the control center 120. The control center 120 may decompress and decode the received MPEG transport stream by means of an MPEG decoder, in such a way to be able to directly calculate the quality of both the audio and the video.

In background, the remote unit RU performs measures on the strength of the received TV signal TVS. The signal IFTVS is fed to the measure block 210, which includes two sub-systems. A first sub-system 248 is adapted to measure the peak voltage of the signal IFTVS, while a second sub-system 250 is adapted to measure the RMS thereof. The sub-system 248 includes a filter circuit 252, an amplifier 254, a peak detector circuit 256 and an Analog to Digital Converter (ADC) 258. The sub-system 250 similarly includes a filter circuit 260, an amplifier 262, an RMS detector circuit 264 and an ADC 266. The ADCs 258 and 266 are connected to the microprocessor 214 via the I²C bus 290.

In case the TV signal TVS is an analog TV broadcasting signal, the signal IFTVS is provided to the sub-system 248. The signal IFTVS is firstly filtered by the IF filter circuit 252, then it is amplified by the amplifier 254 and fed to the peak detector circuit 256. The peak detector circuit 256 provides in turn a continuous voltage Vpk proportional to the peak of the signal IFTVS. Said continuous voltage Vpk is then converted into a corresponding digital form by the ADC 258, and the digitalized value is sent to the microprocessor 214 via the I²C bus 290.

In case instead the TV signal TVS is a DTV broadcasting signal, the signal IFTVS is provided to the sub-system 250. The signal IFTVS is firstly filtered by the filter circuit 260, then it is amplified by the amplifier 262 and sent to the RMS detector circuit 264. The RMS detector circuit 264 provides in turn a continuous voltage Vrms proportional to the root mean square of the signal IFTVS.

This Vrms signal is then converted into a corresponding digital form by the ADC 266, and provided to the microprocessor 214 via the I²C bus 290.

It is pointed out that the filter circuits 236, 242, 252 and 260 may be substituted by a single filter circuit directly connected to the output of the tuner circuit 234.

Having described the structure of the remote units RU in terms of their functional blocks, their typical operations will be now described in the following.

Each remote unit RU repeatedly executes, in background with respect to possible extemporary requests received from the control center 120, measures of the peak and/or RMS levels of TV signal TVS, and compares the results of the measures with predetermined threshold levels. If at least one of said results falls outside predetermined ranges, the remote unit RU notifies this event, for example by alerting the control center 120. Said repeated measures may be conducted on different transmission channels, periodically scanning in a cyclic way predetermined transmission channels, or even one or more of the whole VHF/UHF bands, in such a way to analyze the behavior of the TV signal TVS within a selected frequency band. This is made possible by the control operated by the microprocessor 214 of the tuner circuit 234.

More particularly, the generic remote unit RU measures the peak and/or RMS levels of the TV signal TVS of a particular transmission channel for a predetermined measure period TCH, sufficiently long to enable the sub-system 248 and/or 250 performing the measure on the selected channel, for example equal to 120 seconds. When the measure period TCH is expired, the transmission channel is switched, and the remote unit RU performs the measures on another transmission channel.

Figure 4A:
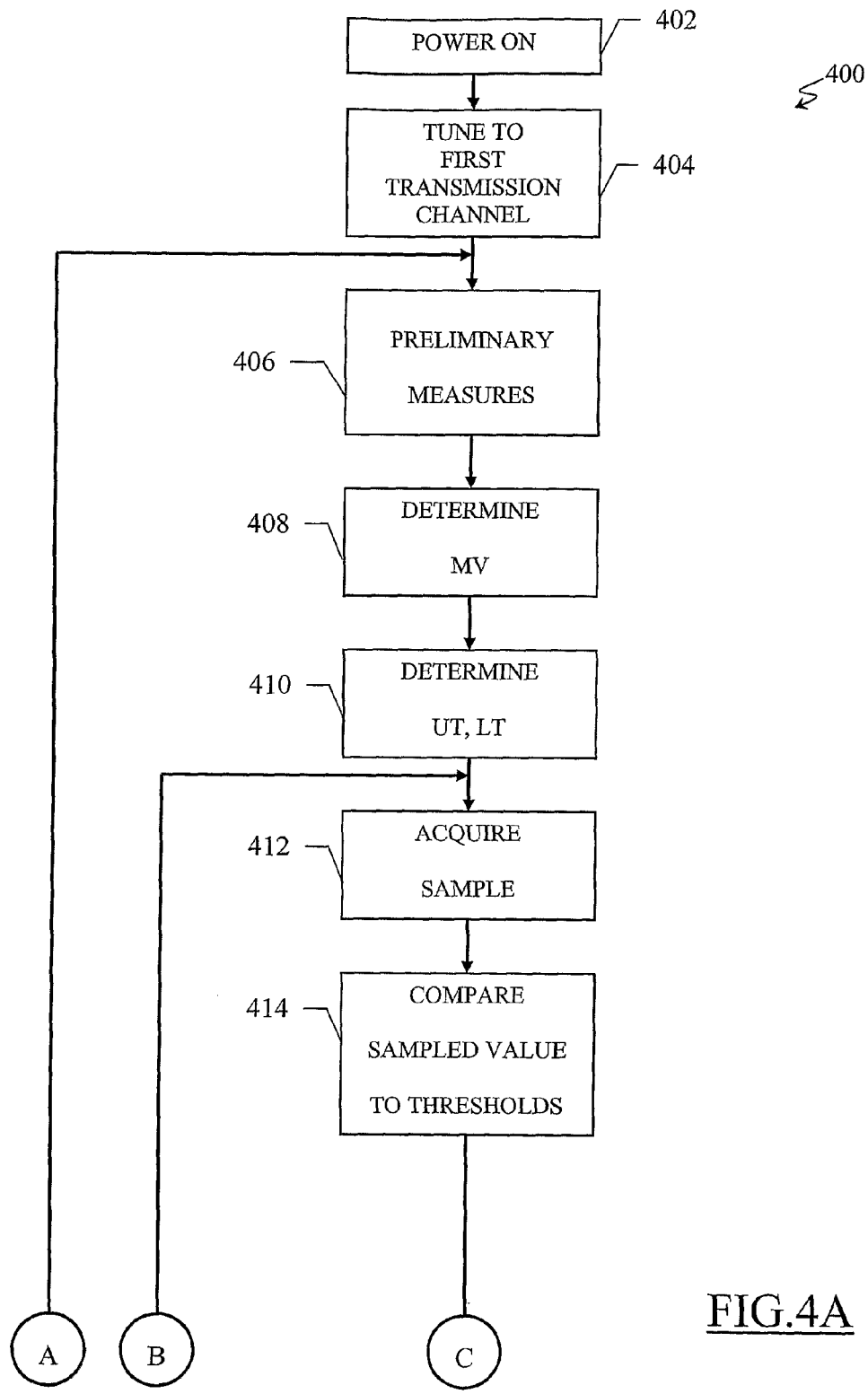
FIGS. 4A and 4B illustrate a schematic flow chart of a procedure for the measurement operations performed by a generic remote unit of the system during its background operation.
Figure 4B:
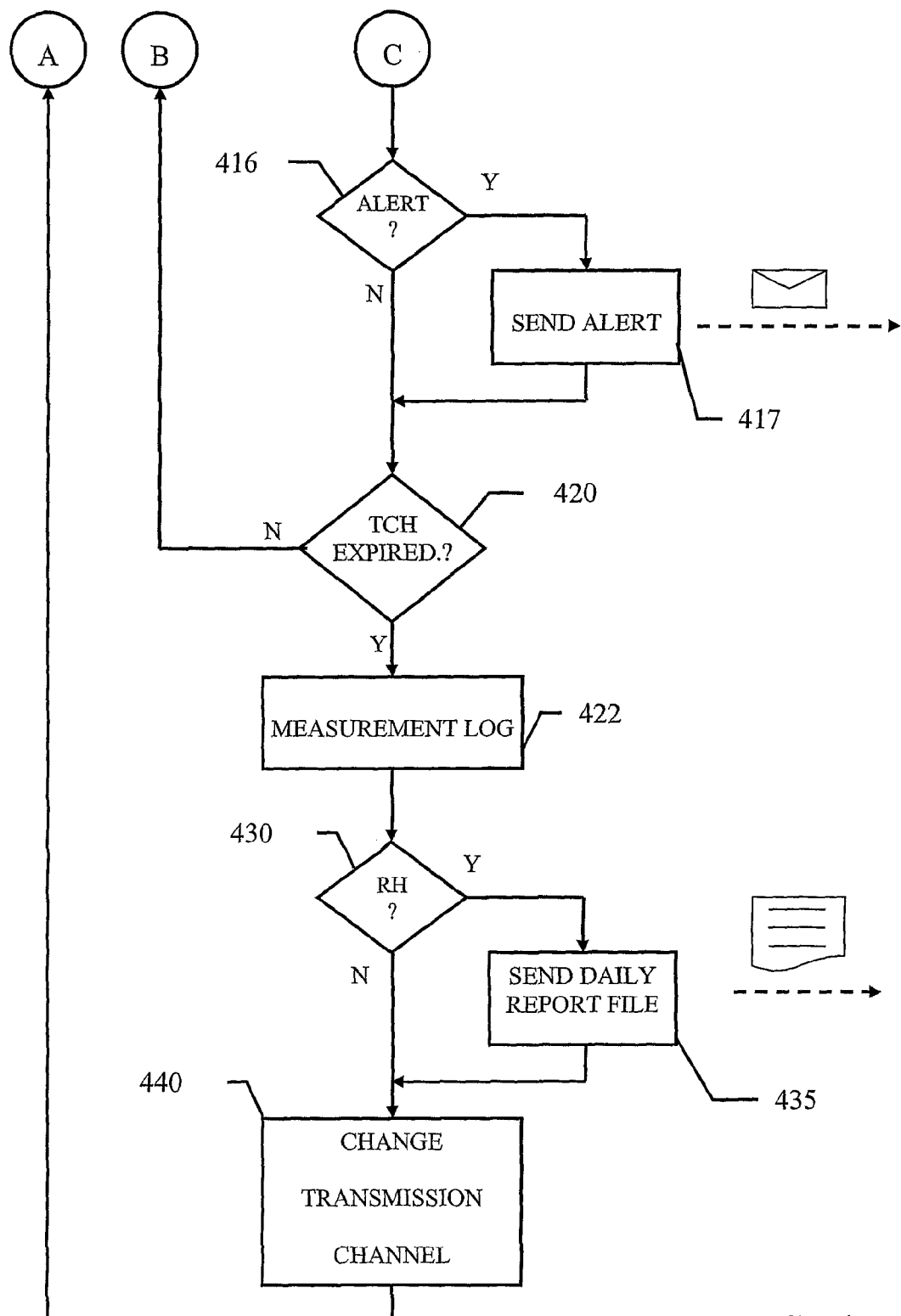

In greater detail, referring to FIGS. 4A and 4B, a schematic flow chart of a procedure 400 for the measurement operations performed by a generic remote unit RU during its background operation is illustrated.

When the remote unit RU is turned on (block 402), the tuner circuit 234 is caused by the microprocessor 214 to tune onto a first transmission channel which has to be analyzed (block 404).

Figure 5:
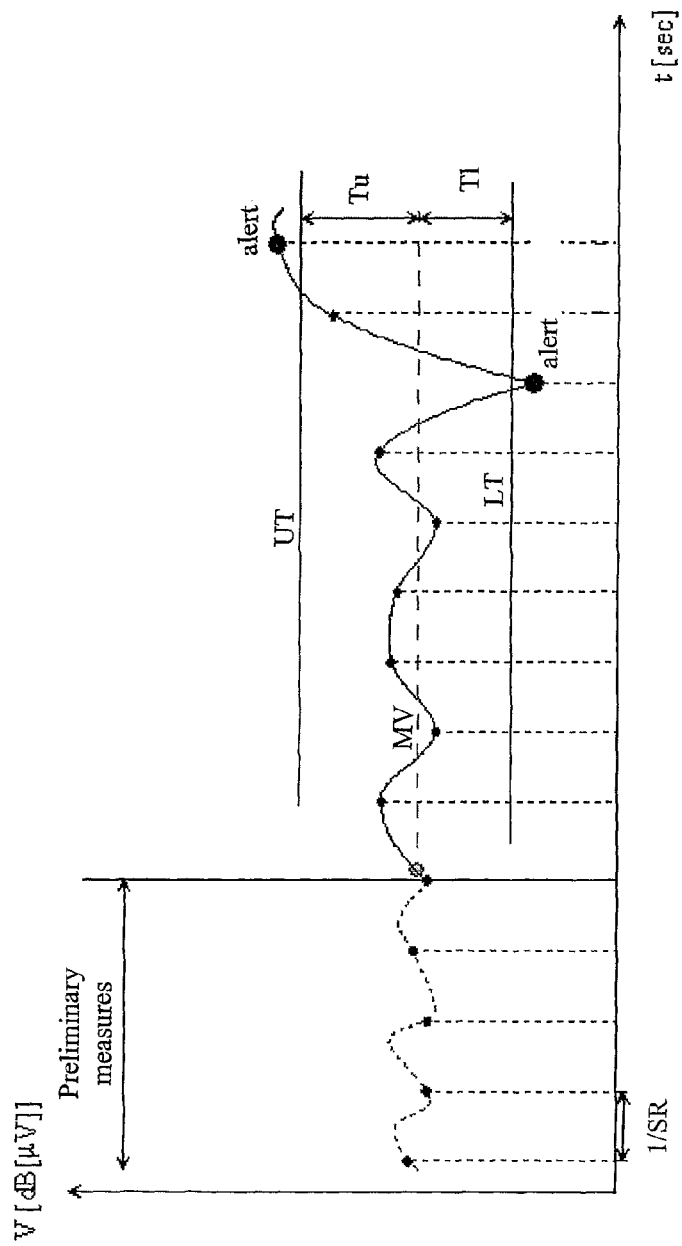
FIG. 5 schematically illustrates how predetermined voltage ranges used in measurement operations are determined, according to an embodiment of the present invention.

Afterward, a remote unit set-up phase is performed. In the set-up phase, the remote unit RU performs a predetermined number of measures (for example, 10) of the TV signal TVS (block 406). For this purpose, the measure block 210 is exploited: if the TV signal TVS is an analog TV broadcasting signal, the sub-system 248 detects the peak value of the signal, and the ADC 258 samples and digitizes the detected peak value, for example with a predetermined sampling rate SR (e.g., an average of ten samples every 100 ms may be taken); similarly, if the TV signal TVS is a DTV broadcasting signal, the subsystem 250 detects the RMS value of the signal, and the ADC 266 samples and digitizes the detected RMS value. The measure samples are exploited by the microprocessor 214 for determining a mean value MV thereof (block 408). FIG. 5 schematically illustrates in diagram form the dependence on time of a peak voltage (in case of analog TV broadcasting signals) or of an RMS voltage (in case of DTV broadcasting signals), expressed in dB[µVolt], of an exemplary TV signal TVS of a generic transmission channel. The preliminary measures are performed in an initial time interval; the distance between adjacent samples is equal to the inverse of the sampling rate SR, i.e., is equal to 1/SR seconds.

The calculated mean value MV is then used by the microprocessor 214 for deriving predetermined voltage ranges that are then used in the following monitoring operation as references for determining whether the received signal is normal or not. In particular, the microprocessor 214 derives an upper threshold voltage UT and a lower threshold voltage LT (block 410). Particularly, the upper threshold voltage UT is obtained by adding a first value Tu to the mean value MV, while the lower threshold voltage LT is obtained by subtracting a second value Tl from the mean value MV; the first and second values may be parameters set by default and stored in the Flash memory 216. For example, the first value may be 15 dB, and the second value may be 10 dB. The range delimited by the upper and lower threshold voltages UT, LT defines the range of expected voltage values for the peak voltage or the RMS voltage of the measured TV signal TVS. As described later, the threshold voltages UT, LT are used as follow: in case the peak voltage or the RMS voltage fall below the lower threshold voltage LT, the transmission is determined to be too weak; conversely, in case the peak voltage or the RMS voltage exceeds the higher threshold voltage UT, the transmission is assumed to be excessively strong.

The set-up phase is thus completed.

A measurement loop is then entered.

In the generic iteration of the measurement loop, the measure block 210 provides to the microprocessor 214 a sample of the peak value or RMS value of the TV signal TVS (block 412). The microprocessor 214 compares the value of the new sample with the upper and lower threshold voltages UT, LT (block 414); if the value is higher than the upper threshold voltage UT or lower than the lower threshold voltage LT, the microprocessor 214 notifies this abnormal event to the control center 120 (decision block 416, exit branch Y, and block 417), for example by sending thereto an alert SMS, by means of the GSM modem 226. The alert SMS sent to the control center 120 may include a series of data including the type of alarm (measured value exceeding the upper threshold voltage or falling below the lower threshold voltage), the time at which the abnormal event occurred and an identifier of the remote unit RU sending the notification. An exemplary syntax of an alert SMS may be the following:

REMOTEALARM,Id=50,AIMd=223,AIEv=2,2005-05-11,17:10:25,121,41# wherein REMOTEALARM is a constant prefix, Id is a numeric or alphanumeric code identifying the remote unit RU that is sending the notification, AIMd is a numeric code establishing the modality of transmission of alarm, in the present example the SMS, and AIEv is a numeric code parameter identifying the type of alarm occurred. Then, the SMS includes the date and the time at which the abnormal event occurred. The last part of the SMS indicates the transmission channel(s) to which the alert relates (in the example shown, the channels 121 and 41). A predetermined character or string of characters (in the example, the character #) indicates the end of the message.

It is observed that, in addition to monitoring and signaling the trespassing of the upper and lower threshold voltages UT, LT, further events may be detected by the (microprocessor 214 of the) remote unit RU. For example, alert notifications may be issued in case the tuner circuit 234 is not able to tune onto the desired transmission channel (a situation that can correspond to an extremely low, practically absent signal IFTVS, or to a tuner malfunctioning), if the sampled value is higher than a maximum voltage higher than the upper threshold voltage (for example 103 dB) or if the sampled value is lower than a minimum voltage lower than the lower threshold voltage (for example 35 dB). Moreover, in addition to notifying the events of trespassing the upper/lower threshold voltages and/or the maximum/minimum voltages, events corresponding to the return of the signal into the corresponding ranges may be notified to the control center 120.

The operations of sampling, comparing and, if necessary, notifying are repeated on the currently selected transmission channel until the corresponding measure period TCH is expired (exit branch N of decision block 420, and connector B, jumping back to the block 412).

At the end of the measure period TCH (exit branch Y of decision block 420), the microprocessor 214 saves into a dedicated storage area, for example of the flash memory 216, a measurement log including the highest and the lowest (peak or RMS) values that have been measured during the measure period TCH (block 422). If during said measure period TCH one or more notifications, e.g. one or more alert SMSs, have been sent to the control center 120, the text of the SMS is also saved in the measurement log.

The above operations are repeated for the various transmission channels to be monitored: the microprocessor 214 then causes the tuner circuit 234 to tune onto another transmission channel (block 440), following the previous transmission channel in the scanning list, and the measurement operations previously described are repeated for the new transmission channel (connector A, jumping back to the block 406).

The collection of all the measurement logs taken by the remote unit RU in a predetermined time period, for example one day, forms a so-called daily report file, and is sent to the FTP server 130 at a predetermined reporting time RH (decision block 430, exit branch Y), for example establishing an FTP upload file session, or by means of an email, or via an SMS. The daily report file provides a summary of the measurement campaign conducted by that remote unit RU during the day. The daily report file may also provide additional data regarding the remote unit RU itself, and the parameter (e.g., lower threshold voltage, upper threshold voltage) used for the measures.

Particularly, an exemplary daily report file may include four distinct parts. A first part includes information describing the remote unit RU, like its identification number Id and the telephone number of its GSM modem, and the parameters used by the remote unit RU for the measurements, like for example the measure period TCH, the first and second values Tu and Tl used to determine the threshold voltages, and the like. A second part is a list including the number of alarms occurred during the day, the number of measures performed (e.g., expressed in terms of number of measure periods TCH), the tuning errors, i.e. the number of times the tuner circuit 234 has not been able to tune onto a desired transmission channel. A third part of the report is a list of the transmission channels monitored, and, for each channel, a short description of the alarms that have been issued in respect thereof, if any. A fourth part of the report is a list of the measurement logs taken during the day in respect of which some abnormal condition has been detected.

In addition to performing the abovementioned signal strength measurement operations, each remote unit RU may also manage, either in background or upon request from the control center 120, for example received via an SMS, the operations necessary for the acquisition of the video frames of the broadcasted video signal, in case the TV signal TVS is an analog TV broadcasting signal, or for the acquisition of the broadcasted MPEG transport stream, in case the TV signal TVS is a DTV broadcasting signal.

Figure 6:
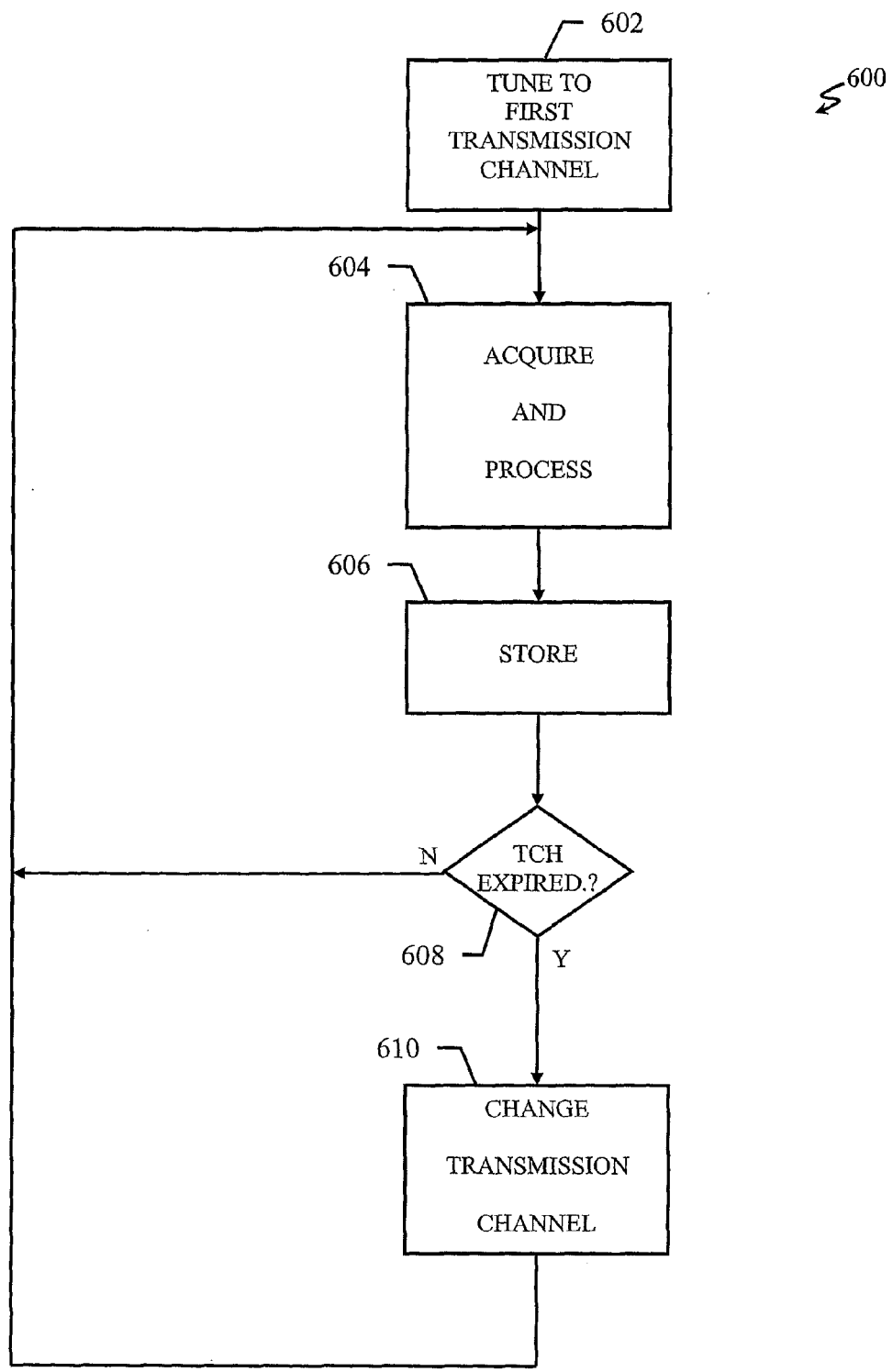
FIG. 6 illustrates a flow chart of a procedure for the video frames acquisition performed by a generic remote unit during its background operation.

Referring to FIG. 6, a flow chart of a procedure 600 for the video frames acquisition, assumed to be performed in background, particularly in parallel to the signal strength measurements described in the foregoing, is illustrated.

After the tuner circuit 234 has tuned onto a first transmission channel (block 602), the analog signal processing block 206 (in case of an analog TV broadcasting signal), or the digital signal processing block 208 (in case of a DTV broadcasting signal) starts acquiring and processing the audio and video components carried by the TV signal TVS (block 604). In particular, in case of analog TV signal, the video processor 240 extracts the audio component and, if so requested by the control center 120, the microprocessor 214 can cause the sending of the extracted audio signal to the control center via GSM modem 226 (using a common, circuit-switched call).

An analog TV video frame can be sampled and digitized to obtain, for each frame line (including test/teletext line) a predetermined number of samples, and the samples are stored into the storage device 228 (block 606). Similar operations are performed on the derived MPEG transport stream in case of DTV signal. For avoiding possible drawbacks of limited storage capacity, the memory may exploit a First In First Out (FIFO) policy. For example, referring to the case of analog TV signals, video frames are continuously fed to the storage device memory 228, until its storage capacity is reached. At this point, in accordance with the FIFO policy, the older video frames are replaced with the new ones generated by the analog processing block 206.

The acquisition of a transmission channel lasts for the measure period TCH (decision block 608, exit branch N, jumping back to block 604). At the expiring of the measure period TCH (decision block 608, exit branch Y), the tuner circuit 234 tunes onto the next transmission channel (block 610), and the remote unit RU acquires and stores samples of the video frame or MPEG transport stream for the new transmission channel.

Figure 7:
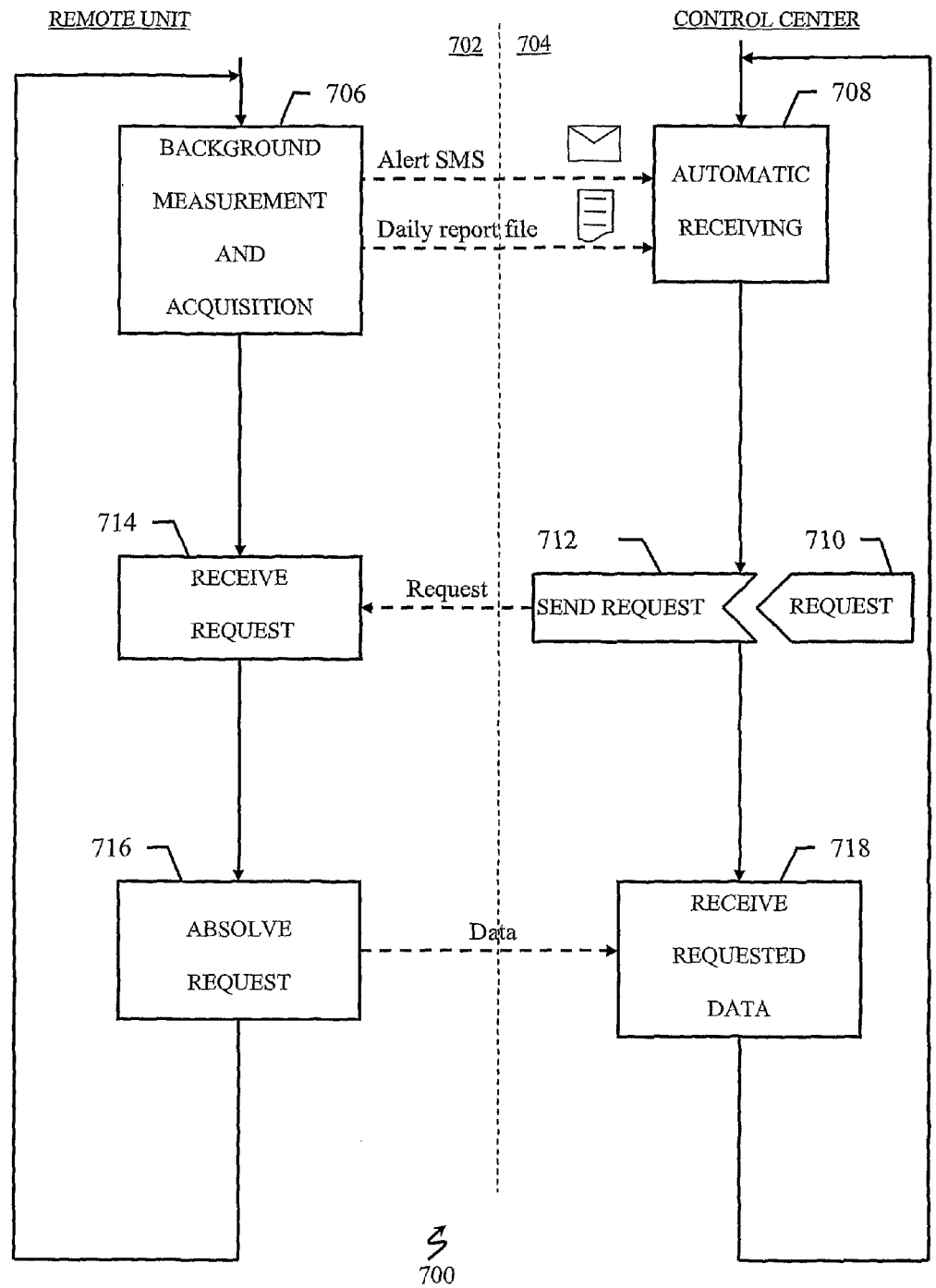
FIG. 7 illustrates a flow chart relating an exemplary operation of the monitoring system, particularly the interaction of a generic remote unit with a control center of the monitoring system, according to an embodiment of the present invention.

Having described hitherto how the generic remote unit RU operates in background, reference is now made to FIG. 7, wherein a flow chart 700 relating an exemplary operation of the monitoring system, particularly the interaction of a generic remote monitoring unit RU with the control center 120 (assumed for simplicity to include the FTP server 130), according to an embodiment of the present invention is illustrated.

Figure 8:
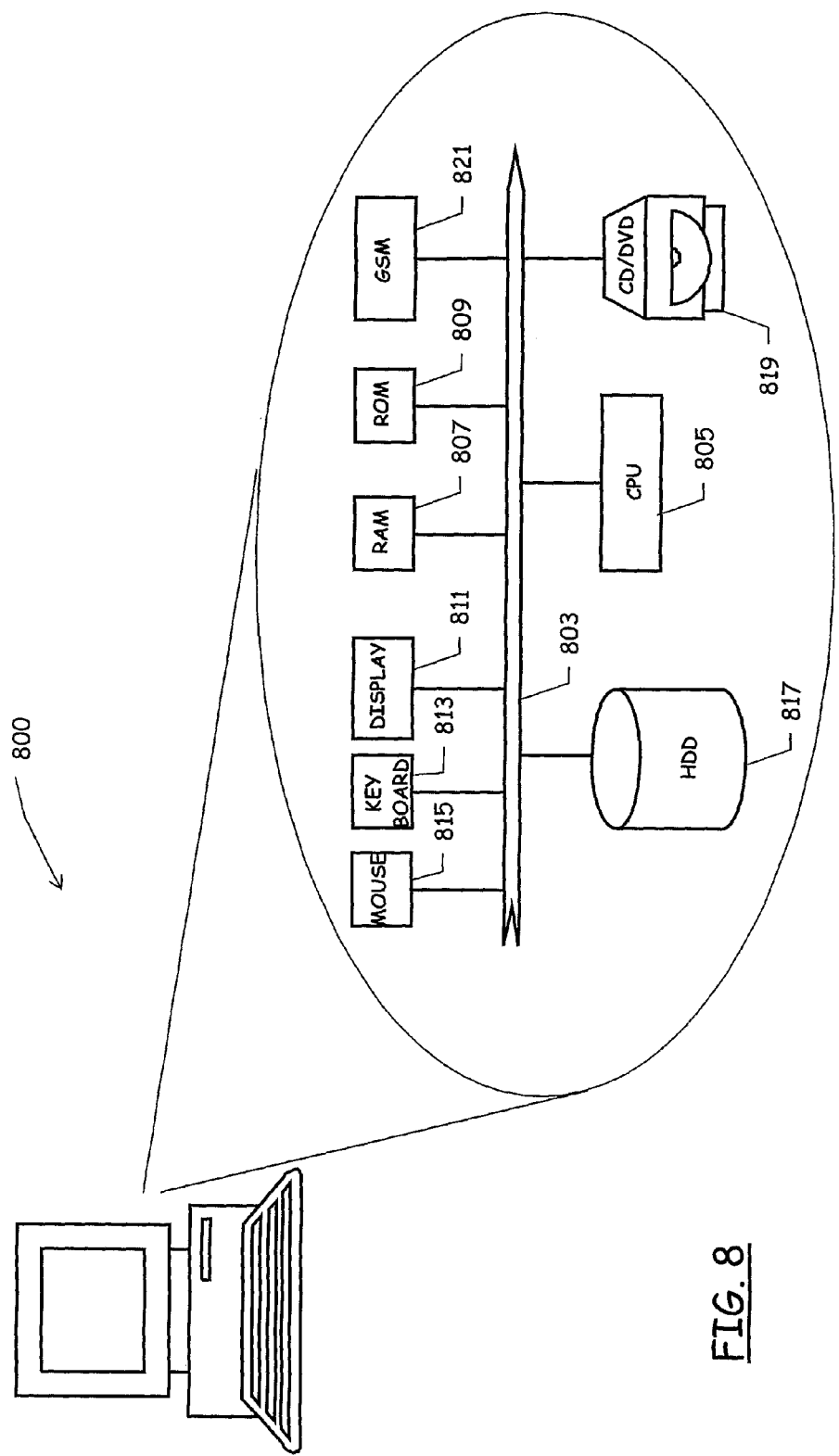
FIG. 8 depicts a data processing apparatus or system that may be included in the control center, according to an embodiment of the present invention.

Preliminary, it is observed that the control center 120 may be or include a data processing apparatus or system of (possibly interconnected) apparatuses, the generic apparatus, e.g. a computer or a workstation or a server machine, having in principle the structure depicted in FIG. 8. The computer 800 generally includes several functional units connected in parallel to a data communication bus 803 (for example a PCI bus). In particular, a Central Processing Unit (CPU) 805, typically comprising a microprocessor (possibly, a plurality of co-operating microprocessors, depending on the processing performances), controls the operation of the computer. A working memory 807, typically a RAM (Random Access Memory) is directly exploited by the CPU 805 for the execution of programs and for temporary storage of data, and a Read Only Memory (ROM) 809 is used for the non-volatile storage of data, and stores for example a basic program for the bootstrap of the computer. The computer comprises several peripheral units, connected to the bus 803 by means of respective interfaces. Particularly, peripheral units that allow the interaction with a human user are provided, such as a display device 811 (for example a CRT, an LCD or a plasma monitor), a keyboard 813 and a pointing device 815 (for example a mouse). The computer also includes peripheral units for local mass-storage of programs (operating system, application programs) and data, such as one or more magnetic Hard-Disk Drivers (HDD), globally indicated as 817, driving magnetic hard disks, a CD-ROM/DVD driver 819, or a CD-ROM/DVD juke-box, for reading/writing CD-ROMs/DVDs. Other peripheral units may be present, such as a floppy-disk driver for reading/writing floppy disks, a memory card reader for reading/writing memory cards, a Universal Serial Bus (USB) adapter with one or more USB ports, printers and the like. The computer is further equipped with communications peripherals, globally identified by 821, in particular for communicating with the remote units RU; for example, the communications peripherals may include a GSM modem, an RS232 interface, an Ethernet interface.

The computer 800 of the control center 120 is assumed to run a monitoring program, by means of which it can interact with the remote monitoring units RU, receive information therefrom, and issue requests thereto. The program is installed on the computer's hard disk, and, when launched, is at least partially loaded in the computer working memory 807.

The flow chart 700 progresses between two different lanes 702, 704. The blocks of the flow chart 700 belonging to the first lane (lane 702) represent operations executed by the generic remote monitoring unit RU, while the blocks belonging to the other lane (lane 704) represent operations executed by the control center 120.

At the power on, the remote monitoring unit RU starts operating in background (block 706), performing the measurement and acquisition operations previously described by the flow charts 400 and 600.

At the same time, the control center 120 operates in an automatic listening condition (block 708), in which the control center 120 waits and listens for possible notifications of alert coming from the remote monitoring units RU.

When an alert condition arises, e.g., when the peak voltage of the analog TV signal TVS measured by the remote monitoring unit RU exceeds the upper threshold voltage UT, the remote monitoring unit RU issues a notification, which is received by the control center 120. As previously explained, said alert notification may be provided in the form of an alert SMS sent by the remote monitoring unit RU via for example the GSM modem 226. The control center 120, upon receipt of the notification, may accordingly inform an operator thereof (for example, displaying an alarm on the screen of the display), and/or the alert SMS may be saved on the FTP server 130. As previously described, the remote monitoring unit RU is adapted to generate a daily report file every day at a reporting time RH. Said daily report file may be sent via email or SMS to the control center 120, or to the FTP server 130.

When the control center 120 wishes to submit to the remote monitoring unit RU a particular request, for example because so instructed by an operator thereof (block 710), the control center 120 sends the request (block 712) to the remote monitoring unit RU. The request may include, for example, a demand of a particular video frame, a part thereof, or a chunk of the MPEG transport stream, stored into the storage device 228 of the remote monitoring unit RU; moreover, the control center 120 may request that the remote monitoring unit RU sends to the control center the result of one or more peak or RMS measures of the received TV signals. The request may be sent for example via GSM, or via RS232, or via Ethernet The remote monitoring unit RU receives the request coming from the control center 120 by means of, e.g., the GSM modem 226 (block 714).

After the remote monitoring unit RU has performed the actions involved in said request (block 716), the control center 120 receives in response the desired data, if any (for example, the control center may simply ask the remote monitoring unit RU to switch onto a certain transmission channel, an operation which does not involve the sending back of data) (block 718). Then, the remote monitoring unit RU continues its normal operation (jump back to block 706).

In a similar way, the control center 120 may send to the remote monitoring units configuration parameters, and/or software updates.

Based on the information received from the remote monitoring unit(s) RU, the control center 120 may perform (possibly in real-time) actions directed to improve the quality of the received TV signal and/or to solve temporary malfunctions of the transmitting stations or of other apparatuses involved in the TV signal broadcasting. The signals received from the remote monitoring unit(s) RU may therefore be used by the control center 120 as a feedback signal for monitoring the quality of the broadcast TV signal and for adjustment thereof.

It is pointed out that the operations performed by the generic remote monitoring unit, previously described as executed by hardware blocks, can be either totally or partially accomplished by means of software and/or firmware modules, for example carried out by the microprocessor included therein. Similarly, the operations performed by the control center may be executed either by software modules used by the computer included therein or by dedicated hardware blocks implementing them.

The invention claimed is:

1. A monitoring system for monitoring television signals broadcast by at least one transmission antenna in a broadcast area, comprising:
at least one monitoring control center; and
at least one remote monitoring unit positioned in a television signal receiving location of said broadcast area remote from said transmission antenna, said remote monitoring unit being configured to receive the television signal irradiated in said location, process said television signal and send to said monitoring control center information related to the processed television signal;
wherein said monitoring control center is configured to control said broadcast television signal responsive to said information received from the remote monitoring unit.

2. A monitoring system for monitoring television signals broadcast by at least one transmission antenna in a broadcast area, comprising:
at least one monitoring control center; and
at least one remote monitoring unit positioned in a television signal receiving location of said broadcast area remote from said transmission antenna, said remote monitoring unit being configured to receive the television signal irradiated in said location, process said television signal and send to said monitoring control center information related to the processed television signal, wherein said remote monitoring unit comprises:
a receiver adapted to receive the television signal;
a measuring system adapted to perform signal quality measures on radio-electric features of the received television signal; and
a communication system adapted to communicate signal quality measurement results to the remote monitoring center, exploiting a communication link between the remote monitoring unit and the control center.

3. The monitoring system of claim 1 or 2, wherein the at least one remote monitoring unit comprises a plurality of remote monitoring units distributed on the broadcasting area.

4. The monitoring system of claim 1 or 2, wherein said measuring system of the remote monitoring unit comprises at least one among a signal peak detector adapted to detect a peak of the received television signal, and a signal root mean square value detector adapted to detect a root mean square value of the received television signal.

5. The monitoring system of claim 2, wherein the remote monitoring unit further comprises a control system, said control system adapted to establish whether the received television signal complies with predetermined signal quality constraints.

6. The monitoring system of claim 5, wherein said control system is further adapted to cause the communication system to send to the monitoring control center a notification in case the received television signal does not comply with predetermined signal quality constraints.

7. The monitoring system of claim 1 or 2, wherein the remote monitoring unit further comprises a signal processing system adapted to extract from the received television signal information contents carried by the signal.

8. The monitoring system of claim 7, wherein said information contents comprise at least one of a video content, an audio content, teletext data, and test data.

9. The monitoring system of claim 7, wherein the remote monitoring unit further comprises a local storage adapted to store the extracted information contents.

10. The monitoring system of claim 7, wherein the control system is further adapted to cause the communications system to send to the monitoring control center, the stored extracted information contents.

11. The monitoring system of claim 1 or 2, wherein the remote monitoring unit is adapted to automatically conduct measurements of the received television signal quality according to a predetermined measurement schedule.

12. The monitoring system of claim 1 or 2, wherein the remote monitoring unit is adapted to conduct measurements on the received television signal responsive to a request from the monitoring control center.

13. The monitoring system of claim 1 or 2, wherein said remote monitoring unit is adapted to receive from the monitoring control center, configuration parameters for configuring an operation of the remote monitoring unit.

14. The monitoring system of claim 1 or 2, wherein said communication link comprises a mobile telephony network link.

15. The monitoring system of claim 1 or 2, wherein the monitoring control center and the remote monitoring unit are configured to communicate via SMS.

16. The monitoring system of claim 2, wherein said monitoring control center is configured to control said broadcast television signal responsive to said information received from the remote monitoring unit.

17. A method for monitoring television signals broadcast by at least one television signal broadcasting antenna in a broadcast area, comprising:
providing at least one monitoring control center;
providing at least one remote monitoring unit positioned in a television signal receiving location of said broadcast area and configured to receive the television signal, process said television signal and send to said monitoring control center, information based on the processed television signal; and
using the monitoring control center to control said broadcast television signals responsive to said information received from the at least one remote monitoring.

18. A method for monitoring television signals broadcast by at least one television signal broadcasting antenna in a broadcast area, comprising:
providing at least one monitoring control center;
providing at least one remote monitoring unit positioned in a television signal receiving location of said broadcast area and configured to receive the television signal, process said television signal and send to said monitoring control center, information based on the processed television signal;
measuring signal quality of the received television signal; and
a communication system adapted to communicate signal quality measurement results to the remote monitoring center, exploiting a communication link between the remote monitoring unit and the control center.

19. The method of claim 17 or 18, wherein the at least one remote monitoring unit comprises a plurality of remote monitoring units spread across the area of broadcasting.

20. The method of claim 17 or 18, further comprising:
providing a communication link between the remote monitoring unit and the control center; and
causing the remote monitoring unit to communicate measurement results to the remote monitoring center, exploiting the communication link.

* * * * *